United States Patent Office 3,441,434
Patented Apr. 29, 1969

3,441,434
PRIMER FOR POLYOLEFIN SURFACES
James L. Jezl, Swarthmore, Del., assignor to Avisun Corporation, Philadelphia, Pa., a corporation of Delaware
No Drawing. Filed Sept. 10, 1965, Ser. No. 486,544
Int. Cl. B32b 27/32; C08j 1/50
U.S. Cl. 117—138.8          5 Claims

---

ABSTRACT OF THE DISCLOSURE

A priming composition for rendering the surface of polyolefin articles receptive to paint and ink which consists essentially of a resin, a drying oil, a dryer, a chlorinated ethylene having at least three chlorine atoms, and dichlorobenzene, in specified proportions.

---

This invention relates to primers for polyolefin surfaces, and more particularly to a composition and method for rendering polyolefin surfaces receptive to paints and inks.

Articles formed from polyolefins, such as crystalline polypropylene or polyethylene, find application in a wide variety of uses, such as films, and molded articles such as milk bottle cases, ladies shoe heels, containers of all types, toys, and many other articles. One defect of such articles is that they are very difficult to print or otherwise decorate, since adhesion of paint or printing inks to such articles is extremely poor. Flat surfaces, such as films, may be treated electrostatically or may be subjected to flame treatment to induce surface oxidation of the material and thus improve printability, but it is very difficult, if not impossible from a practical standpoint, to so treat surfaces having other than a plane configuration by such processes. It has in the past been proposed to treat such surfaces with an oxidizing agent such as nitric, sulfuric, or chromic acid, or ozone, in order to induce oxidation of the surface. Such treatment considerably improves the adhesion of paints and inks to the surface, but it is not entirely satisfactory, since chipping of the paint will occur during rough usage of the article, and the process must be carefully controlled in order to avoid undesirable degradation of the polymer. In addition, such agents are toxic and corrosive.

I have now found that a polyolefin article may be treated with a priming composition comprising a resin or mixture of resins, a drying oil, a dryer such as lead, cobalt, or manganese naphthenates or linoleates, and a chlorinated alkane such as perchloroethylene or trichloroethylene or mixtures thereof to yield an article to which inks and paints strongly adhere, even when subjected to very rough usage. When perchloroethylene is used as the chlorinated alkane, it is necessary to also include dichlorobenzene in the mixture, but when trichloroethylene is used, dichlorobenzene is not necessary, although improved results are obtained by including dichlorobenzene in the priming mixture.

The resin component of my priming composition may be any resin of the type used in varnishes, such as rosin, metallic resinates, ester gums, phenolic resins, modified phenolic resins, terpene resins, cumarone-indene resins, petroleum resins, or natural resins. The drying oil component of my priming composition may be any drying oil used in the paint and varnished industry, such as tung oil, oiticica oil, chinawood oil, linseed oil, dehydrated castor oil, safflower oil, fish oil, or maleinized soybean oil. For a further discussion of such resins and oils, reference is made to Encyclopedia of Chemical Technology, edited by Kirk and Othmer, Volume 14, pages 645 et seq., published by The Interscience Encyclopedia, Inc., New York, 1955.

Instead of blending the individual resins, drying oils, and dryers with the dichlorobenzene and perchloroethylene or trichloroethylene, a commercial varnish containing these materials may be used, in which case the priming composition will additionally contain mineral spirits.

While the ratios of the various components of the priming composition are not ciritical, the composition must contain both dichlorobenzene and perchloroethylene, or trichloroethylene in order to achieve good results. Typical ratios of the components are as follows, all percentages being by weight.

FORMULA I

|  | Percent |
|---|---|
| Resin | 2–10 |
| Drying oil | 2–10 |
| Dryer | 0.01–0.1 |
| Dichlorobenzene | 15–30 |
| Perchloroethylene | 50–80 |

FORMULA II

| Resin | 2–10 |
|---|---|
| Drying oil | 2–10 |
| Dryer | 0.01–0.1 |
| Trichloroethylene | 80–96 |

These percentages do not allow for the presence of mineral spirits, in the event that the resin, drying oil, and dryer are derived from commercial varnish. If varnish is used in the composition, the above percentages should be adjusted to take into account the amount of mineral spirits present.

The priming composition may be applied to the polyolefin article by soaking the article to be treated in the priming composition for a period of from about 30 seconds to a few minutes at a temperature of from about 80° C. to 100° C. The article is then removed from the composition and dried at 100° C. to about 120° C. for a period of from about 30 minutes to about 3 hours. If desired, the treatment can be repeated. Inks and paints adhere strongly to the articles so treated and cannot be chipped off unless the handling is so rough as to deform the polyolefin surface.

In order that those skilled in the art may more fully appreciate the nature of my invention and the method of carrying it out, the following examples are given.

Example 1

A mixture was made up consisting of one part of a commercial varnish sold under the trade name of Marine Varnish Formula 951, 1 part of dichlorobenzene, and 4 parts of perchloroethylene. The varnish was made up of 50 percent solids consisting of a phenolic resin, pentaerythritol ester gum, and chinawood oil, the balance being mineral spirits containing a dryer. Test strips of polypropylene were immersed in this mixture for a period of 1 minute at 90 to 100° C., after which they were removed and dried in a forced draft oven at 100 to 120° C. for a period of 1½ hours. They were now dry to the touch and had a satiny surface to which inks and paints strongly adhered. A second treatment yielded strips having a glossy surface to which inks and paints also adhered tenaciously.

Example 2

Example 1 was repeated, except that a commercial varnish sold under the trade name of Valspar was used. The exact materials contained in this varnish are unknown to me. Similar results were obtained.

The invention claimed is:

1. A priming composition for polyolefins consisting essentially of a resin, a drying oil, a dryer, and a chlorinated ethylene having at least three chlorine atoms in the molecule in the following proportions by weight:

| | Percent |
|---|---|
| Resin | 2–10 |
| Drying oil | 2–10 |
| Dryer | 0.01–0.1 |
| Chlorinated ethylene | 50–96 |
| Dichlorobenzene | 0–30 |

2. A composition according to claim 1 in which the resin is selected from the group consisting of rosin, metallic resinates, ester gums, phenolic resins, modified phenolic resins, terpene resins, coumarone-indene resins, petroleum resins, and mixtures thereof, and the drying oil is selected from the group consisting of tung oil, oiticica oil, chinawood oil, linseed oil, dehydrated castor oil, safflower oil, fish oil, and maleinized soybean oil, and mixtures thereof.

3. A method for conditioning the surface of polyolefin articles to render them receptive to inks and paints which comprises immersing the polyolefin article in the composition of claim 1 at a temperature of from 80° C. to 100° C. for a period of time from about 30 seconds to several minutes, and thereafter drying the article.

4. A composition according to claim 1 in which the chlorinated ethylene is trichloroethylene.

5. A composition according to claim 1 in which the chlorinated ethylene is perchloroethylene and the dichlorobenzene is present in the amount of 15 to 30% by weight.

References Cited

UNITED STATES PATENTS

| 2,142,039 | 12/1938 | Abrams et al. | 260—33.8 X |
| 2,584,300 | 2/1952 | Simmers | 106—222 X |
| 3,354,237 | 11/1967 | Shaw | 260—33.8 X |
| 3,361,693 | 1/1968 | Geschwind | 260—33.8 X |

FOREIGN PATENTS

| 831,053 | 3/1960 | Great Britain. |
| 685,194 | 4/1964 | Canada. |

WILLIAM D. MARTIN, *Primary Examiner.*

J. E. MILLER, *Assistant Examiner.*

U.S. Cl. X.R.

106—222, 226; 117—76, 90, 91, 161, 168; 260—19, 23, 33.8